United States Patent
Bolosky (10) Patent No.: US 8,275,970 B2
(45) Date of Patent: Sep. 25, 2012

(54) OPTIMIZING WRITE TRAFFIC TO A DISK

(75) Inventor: William J. Bolosky, Issaquah, WA (US)

(73) Assignee: Microsoft Corp., Redmond, WA (US)

( * ) Notice: Subject to any disclaimer, the term of this patent is extended or adjusted under 35 U.S.C. 154(b) by 720 days.

(21) Appl. No.: 12/121,776

(22) Filed: May 15, 2008

(65) Prior Publication Data

US 2009/0287890 A1 Nov. 19, 2009

(51) Int. Cl.
*G06F 12/00* (2006.01)
(52) U.S. Cl. .......................................... 711/173; 711/170
(58) Field of Classification Search ................... 711/170, 711/173
See application file for complete search history.

(56) References Cited

U.S. PATENT DOCUMENTS

| | | | |
|---|---|---|---|
| 5,666,532 A | | 9/1997 | Saks et al. |
| 5,754,888 A | * | 5/1998 | Yang et al. ............... 710/52 |
| 5,832,515 A | * | 11/1998 | Ledain et al. ............... 1/1 |
| 6,138,125 A | * | 10/2000 | DeMoss ....................... 1/1 |
| 6,148,368 A | * | 11/2000 | DeKoning ............... 711/113 |
| 6,513,051 B1 | | 1/2003 | Bolosky et al. |
| 6,535,949 B1 | | 3/2003 | Parker |
| 6,629,201 B2 | | 9/2003 | Dempsey et al. |
| 7,010,645 B2 | | 3/2006 | Hetzler et al. |
| 7,039,765 B1 | | 5/2006 | Wilkes |
| 7,082,495 B2 | | 7/2006 | DeWhitt et al. |
| 2006/0177067 A1 | * | 8/2006 | Kim et al. ..................... 380/278 |
| 2007/0005882 A1 | | 1/2007 | Gallagher et al. |
| 2007/0233939 A1 | * | 10/2007 | Kim ........................... 711/103 |

OTHER PUBLICATIONS

Budiu, "A Dual-Disk File System: ext4", Dated: Apr. 16, 1997, 17 Pages, Document available at :—http://www.cs.cmu.edu/~mihaib/fs/fs.html.
Matthews, "Improving File System Performance with Adpative Methods", University of California, Berkeley, Year of Publication: 1999, 154 Pages.
Rosenblum, et al., "The Design and Implementation of a Log-Structured File System", Proceedings of the thirteenth ACM symposium on Operating systems principles, Pacific Grove, California, US, Dated: Jul. 24, 1991, pp. 1-15.
"iSCSI", http://iweb.tntech.edu/hexb/research/research_previous.html, retrieved Jan. 10, 2008.

* cited by examiner

*Primary Examiner* — Jared Rutz
*Assistant Examiner* — Gurtej Bansal
(74) *Attorney, Agent, or Firm* — Lyon & Harr, LLP; Katrina A. Lyon (57) ABSTRACT

The write optimizer described in this disclosure optimizes write traffic to a disk. The write optimization technique writes small data sets to be written to a disk drive to a log file in write optimized order and rewrites the small data sets to disk drive in read optimized order when the disk drive is idle. The write optimizer reserves a portion of a disk to be used for write performance improvement, and then takes all small writes to the disk and writes them to the reserved area rather than to their intended destination. When the disk becomes idle (or the reserved area full), the write optimizer takes the data that has been written to the reserved area and that has not been subsequently overwritten and copies it to its final location.

20 Claims, 10 Drawing Sheets

FIG. 10

OPTIMIZING WRITE TRAFFIC TO A DISK

BACKGROUND

Disk drive performance is typically measured in data rate, the number of bytes per second that a drive can deliver to a computer processing unit (CPU), and seek time, the amount of time between when the CPU requests a file on a disk drive and when the first byte of the file is sent to the CPU. Disk drives are very fast at moving data sequentially, but are quite slow at moving data randomly scattered on a disk. This is due to the typical configuration of a disk drive which has a platter or disk that rotates and a disk arm that moves over the disk to access data in particular locations on the disk.

A typical modern disk is able to move about 700 KB of data in the time that it takes to move the disk arm to an arbitrary location. Technology trends will make this number increase over time. Because most data transfer times are very small compared to 700 KB of data, in practice disk drives or disks spend most of their non-idle time moving their arm. Additionally, as technology improves, disk transfer rates keep increasing, while disk seek and rotation times shrink very slowly. Therefore, write performance is becoming critical and almost all of it is taken by seeking desired locations on the disk drive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The write optimizer described in this disclosure optimizes write traffic to a disk drive. In one embodiment the write optimizer makes all writes sequential by writing small data writes to a write optimizer log file and later installing these records from the write optimizer log to a volume of a disk. More specifically, the write optimizer writes small data sets to be written to a disk drive to a write optimizer log file in write optimized order and rewrites the small data sets to the volume of a disk drive in read optimized order. The write optimizer reserves a portion of a volume of a disk to be used for write performance improvement, and then takes all small writes to the disk and writes them to the reserved area rather than to their intended destination on the volume of the disk. When the disk becomes idle and there are records in the reserved area, or the reserved area becomes full, the write optimizer takes the data that has been written to the reserved area and that has not been subsequently overwritten and copies it to its originally intended location on the disk. The ability to take advantage of overwrites and disk idle time greatly improves disk performance.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the write optimizer, reference is made to the accompanying drawings, which form a part thereof, and which is shown by way of illustration examples by which the write optimizer may be practiced. It is to be understood that other embodiments may be utilized and structural changes may be made without departing from the scope of the claimed subject matter.

1.0 Write Optimizer Overview

The write optimizer described herein optimizes write traffic to the volume of a disk. The write optimizer writes small data sets to be written to a disk drive to a write optimizer log file (e.g., the reserved area on the volume) in write-optimized order and rewrites the small data sets to the volume of a disk drive in read-optimized order. The write optimizer reserves a portion of a volume of a disk to be used for write performance improvement, and then takes small writes and writes them to the reserved area rather than to their intended destination on the disk. When the disk becomes idle and there are records in the reserved area (or the reserved area becomes full), the write optimizer takes the data that has been written to the reserved area, that has not been subsequently overwritten, and copies it to its intended location on the disk.

In one embodiment, the write optimizer log records each contain a sequential log serial number (LSN,) an operation type (e.g., write, copy, unmap), a record length, a checksum (of the data and the log record) and a secret number or identifier that identifies the record as a write optimizer log record. Because of checksum and log serial number sequencing, writes become totally ordered (except in the case of the large write optimization). Totally ordered in this context means that if the write optimizer architecture/system crashes and recovers, the set of writes that will be present on the recovered volume is a prefix of the writes in log serial number order. That is, for example, if the write optimizer stamps the writes with serial numbers 1, 2, 3, 4, 5, 6 and then the write optimizer system crashes and recovers the disk might show all of the writes, or might show 1, 2, 3 (a prefix of 1, 2, 3, 4, 5, 6), but will never show 1, 4, 6 without 2, 3, 5. This is not true of large writes, since they are written to the disk volume in parallel with the log writes.

Typically, the data to be written to the volume of a disk is written and read once, and may have to be rewritten a second time as well. For example, for a small write the data is written to the write optimizer log file, read from the log file, and then is moved to a location on the volume of a disk drive. However, because the cost of moving the disk arm is so much larger than the cost of moving the data (for most transfer sizes that are used in practice, and in particular for those that are smaller than the large write size), and because overwrites and idle time are common, in practice employing the write optimizer can result in big disk drive performance gains for writes.

The write optimizer described herein differs greatly from a log-structured file system. First, it is not a file system at all, because it only talks to the volume's Application Program Interface (API), (e.g., using read/write block, no files or directories) and not the file system API. Second, it does not permanently leave the data in write order on the disk. Traditional file systems try hard to lay out data in a way that will optimize it for reading. Some systems, like, for example, the Log-Structured File System (LFS), optimize the data layout for writing. The write optimizer described herein writes in write-optimized order, and then later converts the data to read-optimized order.

1.1 Overview of a Disk Drive

A description of the general operations of a disk drive may be useful in explaining the write optimizer described herein. Most personal computing devices and servers contain one or more disk drives which store changing digital information on a disk or platter, a magnetic medium. This magnetic medium can be easily erased and rewritten and can store data for many years. Data is typically stored to a disk drive in the form of files which are a collection of bytes. When an application program on the computer requests a file, the disk drive retrieves this data and sends it to the computer processing unit of computer. A platter of a disk drive is round and spins at typically 3,600 to 15,000 rpm when the disk drive is operating. An arm that holds read/write heads moves across the spinning platter to access the data stored in different locations on the surface of the platter in sectors and tracks, or to write to the disk. The disk arm is able to move the heads from the center of the platter to the edge of the platter. Tracks are concentric circles, and sectors are a small portion of a track; often tracks have a thousand or more sectors. A disk drive can also be divided into volumes where each volume typically is a single partition of a disk drive containing a certain number of sectors and tracks. In order to increase the amount of information a disk drive can store many disk drives have multiple platters and read/write heads.

Disk drive performance is typically measured in data rate, the number of bytes per second that a drive can deliver to the CPU, and seek time, the amount of time between when the CPU requests one or more sectors and when the first byte of the first sector is sent to the CPU. Seek time is a physical property of any given disk.

Compared to the speed of the processor, the time it takes for the arm of a disk drive to move to the desired sector and track is huge. As a result, to obtain the best disk drive performance arm movement should be minimized as much as possible, and data should be stored in sequential segments on the disk. When a disk drive is first used, the computing device can store files in sequential sectors on the disk drive. However, as the disk fills up, files are erased to reclaim space. These deleted files are scattered all over the disk drive, so when a new files are stored they can be in thousands of scattered locations on the disk. When the computer accesses these files the arm must move all over the surface of the platter, which is very time consuming and significantly degrades the performance of the disk drive.

1.2 Exemplary Architecture

The write optimizer described herein improves disk drive performance by reserving a fixed amount of space (e.g., at the end) of a volume of a data storage drive or disk drive to write small amounts of data sequentially to the reserved area, rather than to their intended destination on the disk drive. Writing these small writes to their intended destination on the disk drive would cause inefficient skipping from place to place on the disk drive and significantly slow computing speeds when a computing device is busy. When the disk drive is idle and there are records in the reserved area, or the reserved area is full, and the data has not been subsequently overwritten, these small writes are written to the disk drive. This significantly improves a disk drive's performance.

Figure 1:
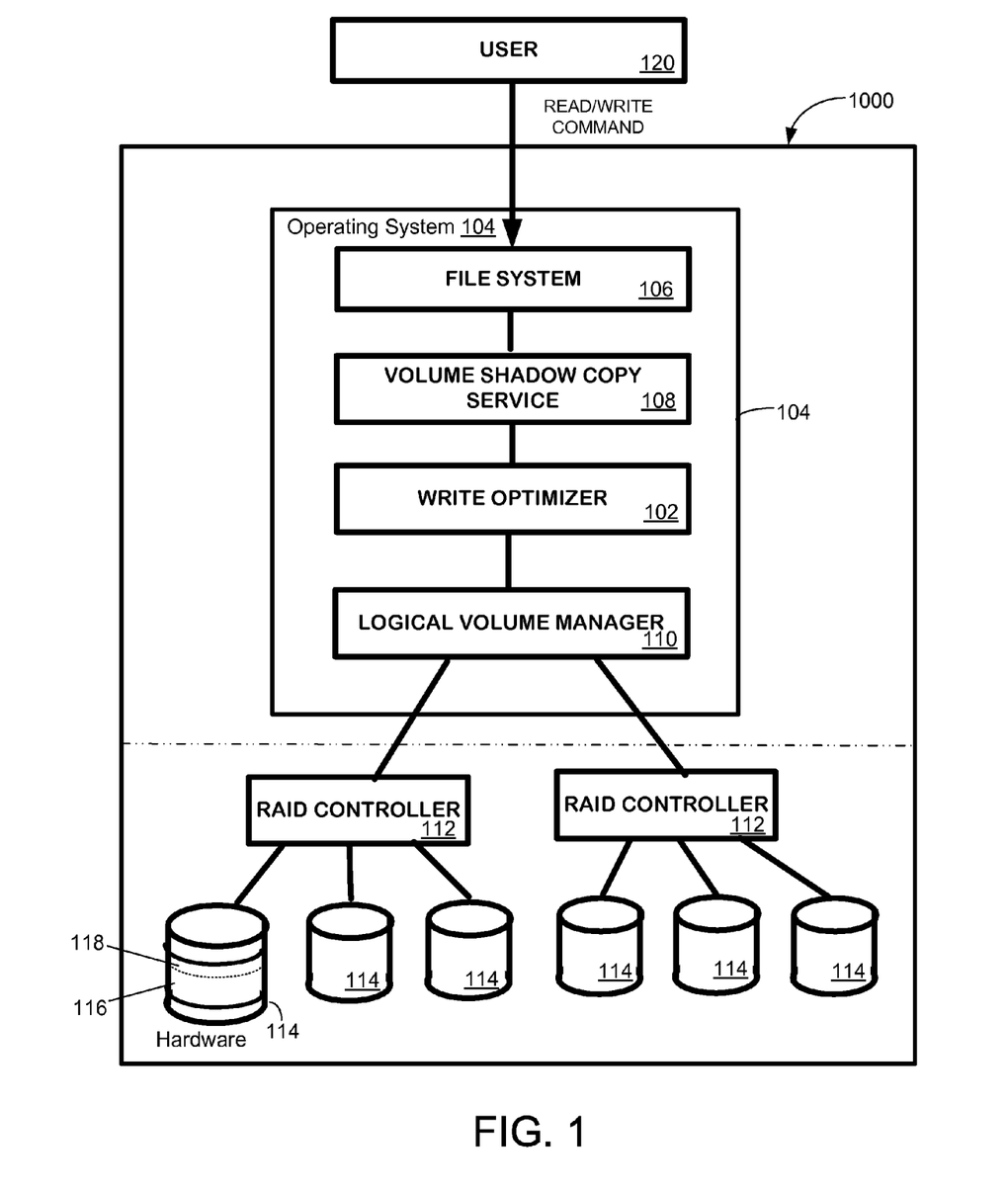
FIG. 1 is a diagram depicting one exemplary architecture in which one embodiment of the write optimizer can be employed.

One exemplary architecture (residing on a computing device 1000 such as discussed later with respect to FIG. 10) in which the write optimizer can be employed is shown in FIG. 1. In one embodiment, the write optimizer 102 is a filter, not a file system of an operating system. More specifically, the write optimizer is typically part of a computer operating system 104. The write optimizer 102 manipulates the data to be written and read to a volume 116: a contiguous range of sectors of a disk drive 114 that respond to read/write commands. These read and write commands are typically specified by a user 120 through a file system 106. The write optimizer 102 reserves a fixed amount of space at the end of the volume 116 for a write optimizer log file 118 which typically is a circular buffer containing headers and written data. Small write data sets are sequentially written to the reserved area or write optimizer log file 118, rather than their intended destination on the disk drive 114. More specifically, in one embodiment, all small writes (in one embodiment, those writes that are less than 0.5 megabytes (MB)) are appended to the end of the write optimizer log file 118. When the disk drive 114 is idle, or the write optimizer log 118 is full, the small writes from the end of the log 118, if not overwritten by subsequent small writes, are applied to the main portion of the disk 118.

In one working embodiment, the write optimizer 102 sits above a Redundant Array of Independent Disks (RAID) controller 112 and below a file system 106 (and below a Volume Shadow Copy Service 108). The RAID controller 112 allows simultaneous use of two or more disk drives to achieve greater performance, reliability and data volume sizes. The RAID controller 112 allows many disks 114 to be viewed by the operating system 104 as a single disk. The Volume Shadow Copy Service 108 snapshots each volume of one or more disk drives 114, creating a copy of files and directories on a volume at a given point in time. In one embodiment of the write optimizer, the Volume Shadow Copy Service 108 allows quick snap-shotting of a volume and uses a copy-on-write function to copy data to a reserved space on the volume of a disk or to a different location in the case of a copy command. The Volume Shadow Copy Service 108 copies X number of sectors from a part of the volume to another part of the volume. More specifically, the Volume Shadow Copy Service 108 sends copy commands to the write optimizer 102, which the write optimizer implements. The write optimizer 102 also interfaces with a snap-shot compatible Logical Volume Manager 110. The Logical Volume Manager 110 recognizes the copy volumes that are created by the Volume Shadow Copy Service 108, and interfaces with the one or more RAID controllers 112. The Logical Volume Manager 110 tracks the size of the volume and the size of the write optimizer log file. For example, if the Logical Volume Manager says the volume is 100 GB and the write optimizer log file is 2 GB, then the exported volume (or main body of the volume) is 2 GB.

Figure 2:
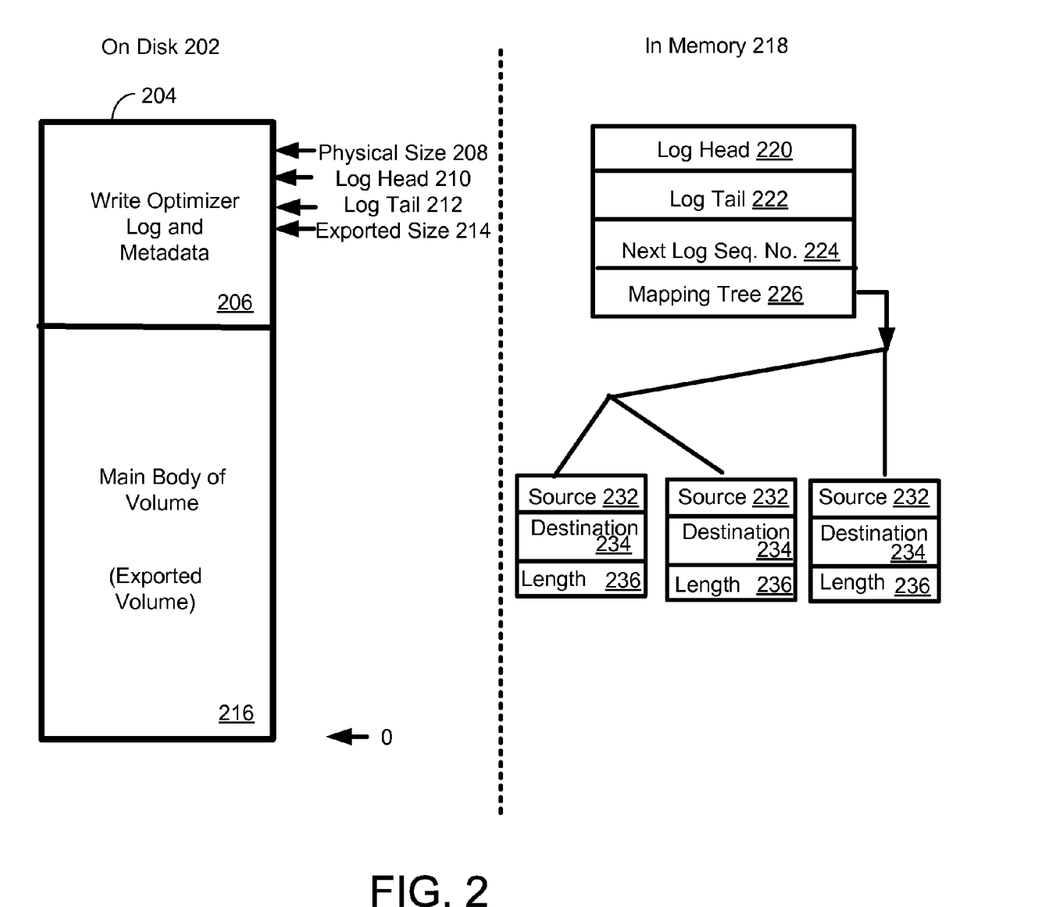
FIG. 2 is a diagram depicting a write optimizer log file of one embodiment of the write optimizer on the left side. The right side shows in memory data structures.

FIG. 2 depicts a schematic of the write optimizer log file 206. On a disk drive 202 each volume 204 has a write optimizer log file 206 with associated metadata. The associated metadata in the write optimizer log, in one embodiment, includes the physical size of the write optimizer log 206, the address of the log head 210, the address of the log tail 212 and the exported size 214. The exported size represents the size of the volume minus the size of the write optimizer log. The write optimizer log file 206 is appended to the main body of a volume 216. Data regarding the write optimizer log file 206 is also maintained in computer memory 218. This data typically includes the log head address 220, the log tail address 222, the next log sequence number 224 and a mapping tree 226 (also called an update map). The inverse of the mapping tree is also maintained in memory (also called an inverse map). The update map/mapping tree 226 contains the source address 232, the destination address 234 and the length of the records in the write optimizer log file or files 236. The update map/mapping tree 226 maps addresses on the main volume 216 to the write optimizer log file 206 (or other places in the volume in the case of a copy). For example, when a read command is specified, the write optimizer looks for the address specified in the read command to see if this address is in the update map, if there is no mapping data for the address in the read command, the read occurs directly from the volume. If the read address is in the write optimizer log or elsewhere on the disk in the case of a copy, then the data is read directly from the write optimizer log. The update map/mapping tree 226 is also used in the case of large writes. If it is determined that a write command involves a large write, a check is made of the update map to see if the address of the write command is in the update map. If an address is in the update map, this entry is removed from the update map. An inverse mapping or inverse map maps addresses on the disk (0 . . . n) to sets of addresses on the exported volume (0 or more of 0 . . . m). This is because one can copy a given range more than one time, so the given range can be the destination of more than one forward mapping. It should be noted that, in the discussion above, n is the size of the volume below the write optimizer, and m is the exported size.

Figure 3:
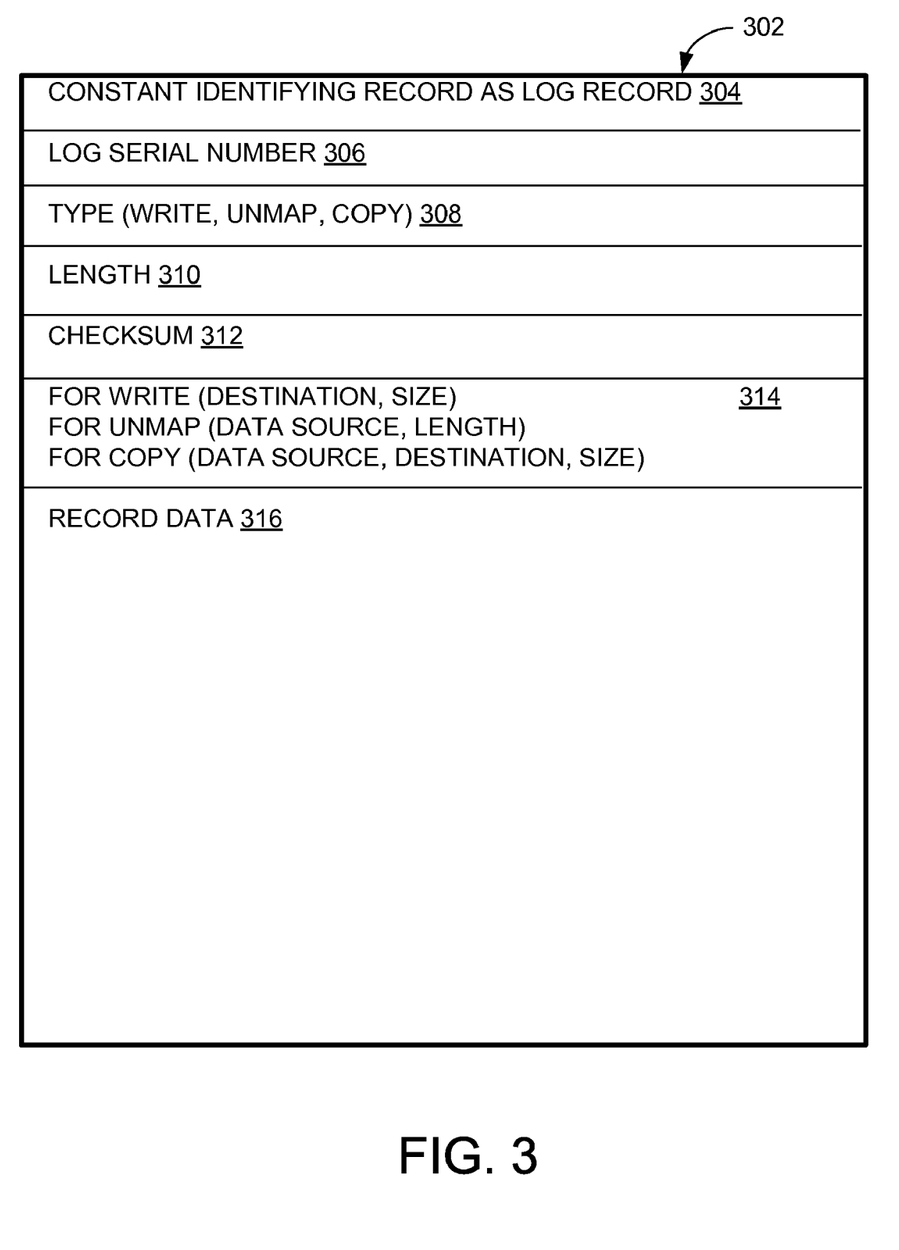
FIG. 3 is a diagram of a record of a write optimizer log file.

As shown in FIG. 3, in one embodiment of the write optimizer, each record of the write optimizer log file 302 includes an identifier number 304, a constant that identifies the record as a write optimizer log record. It also includes a sequential log record serial number 306, a type field (either write, unmap or copy) 308, a length of the record 310, a checksum of the log record 312, for a write command a destination and size, or for a copy command, a data source, and destination address and size or for an unmap command a source and length 314. These fields are then followed by the record data 316

1.3 Exemplary Processes Employing the Write Optimizer.

Figure 4:
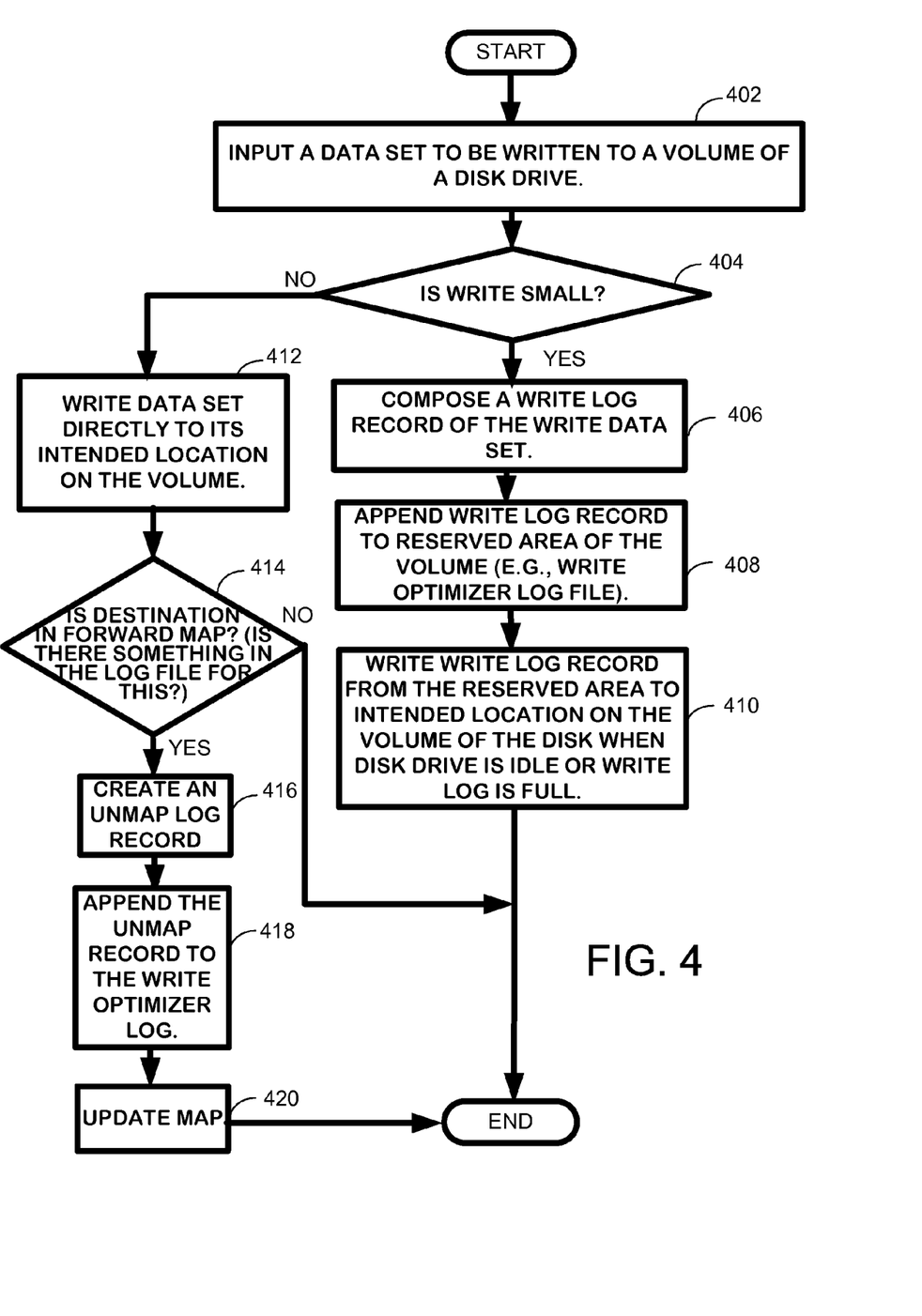
FIG. 4 is a flow diagram depicting a generalized exemplary embodiment of a process employing one embodiment of the write optimizer.

A general exemplary process employing the write optimizer is shown in FIG. 4. This exemplary process assumes that the write optimizer log file is not full initially. If the write optimizer log file were full, data would have to be moved from the write optimizer log file to the main body of the volume (as will be shown with respect to FIG. 8) before more data can be written the write optimizer log file. In a very general sense, this embodiment of the write optimizer operates as follows. A data set to be written to a disk is input (box 402). A determination is made as to whether the data set to be written is small (box 404). If the write is small (box 404), a write log record is composed of the data set to be written (box 406). This write log record is then appended to the tail of the write optimizer log (box 408). The write log record is then written to its intended location on the volume of the disk, if the data it contains has not been subsequently overwritten, when the disk is idle or the write optimizer log is full (box 410). The write log record can be written to its intended location much later in time and many log records can be considered at once. If the write is not small, then the data set is written directly to its intended location on the volume of the disk (box 412). Then a check is made to determine whether the destination of the write is in the update map (e.g., if there is anything in the write log for this write string) (box 414). If there is not, the processing for this input string is completed. If the destination is in the forward map (there is an entry in the write log for it), then an unmap entry is created in the log record, the unmap entry is appended to the write log and the map is updated (boxes 416, 418, 420 and 422).

1.3.1 Exemplary Write Process

Figure 5:
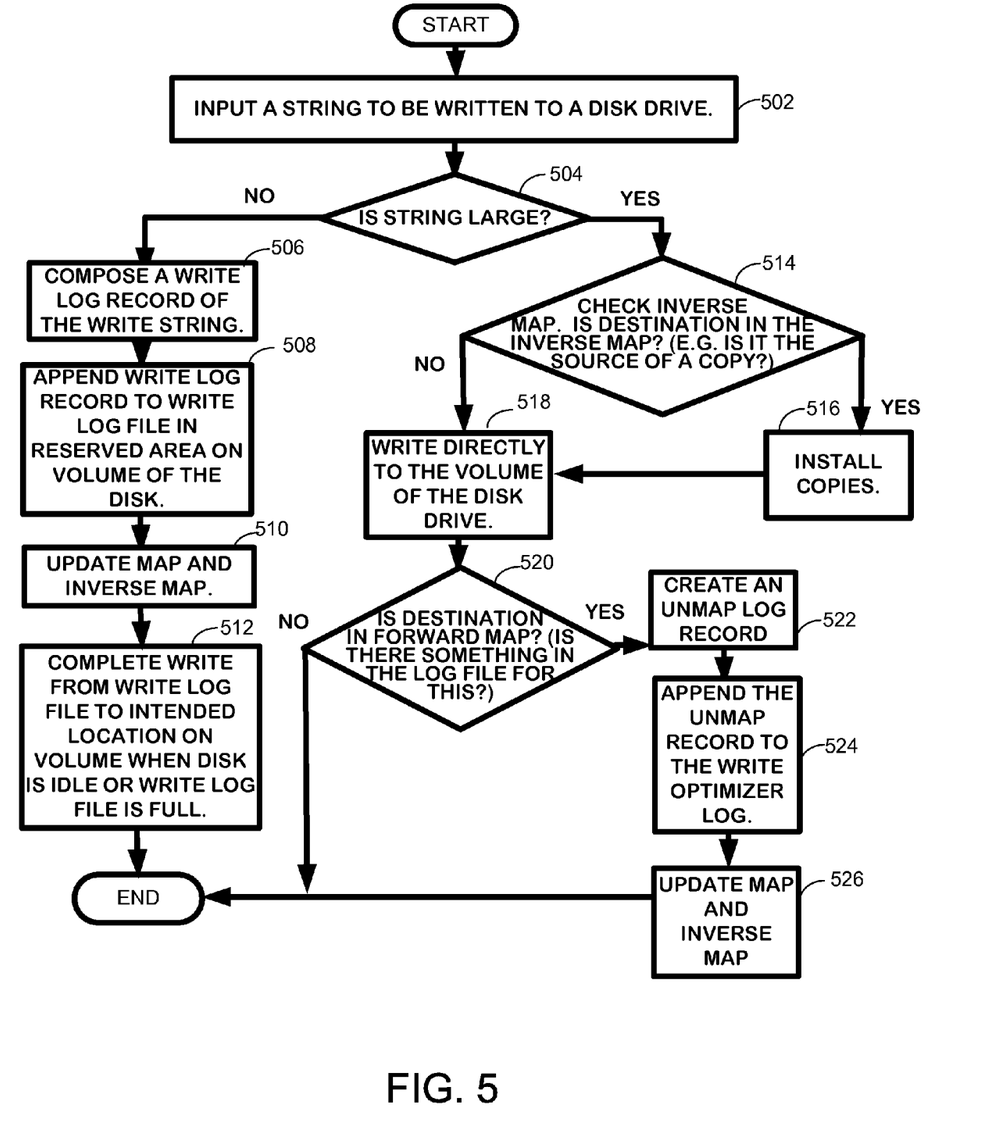
FIG. 5 is a flow diagram depicting another exemplary embodiment of a process employing one embodiment of the write optimizer to execute a write.

Another more detailed exemplary process employing the write optimizer to perform a write to a volume of a disk drive is shown in FIG. 5. Again, as specified with respect to FIG. 4, this exemplary process assumes that the write optimizer log file is not full initially. FIG. 5 differs from FIG. 4 in that it shows explicitly how copies can be executed using the inverse mapping and related processing. In this embodiment, a string to be written to a disk is input (box 502). A determination is made as to whether the string is large or not (box 504). If the write string is not large, a write log record of the write string is composed (box 506) and this write log record is appended to the write optimizer log file (box 508). The update map and inverse map are then updated to reflect the location of the write string in the write optimizer log and the address on the volume (box 510). The write string, if not overwritten, is then written to its intended location on the volume of the disk when the disk is idle or when the write optimizer log file is full (box 512). Alternately, if the write is large (box 504), the inverse map is checked to see if the destination of the write is in the inverse map (box 514). This check is basically made in order to determine if the write string is the source of a copy. If the destination is a source of a copy then the copy or copies are installed to the volume and the write string is written to the volume of the disk drive (boxes 516, 518). If the destination of the write is not it the inverse map (e.g., the destination of the write is not the source of a copy) the write string is written directly to the volume of the disk drive (box 518). Then a check is made to determine whether the destination of the write is in the update map (e.g., if there is anything in the write log for this write string) (box 520). If there is not, the processing for this input string is completed. If the destination is in the forward map (there is an entry in the write log for it), then an unmap entry is created in the log record, the unmap entry is appended to the write log and the map and inverse maps are updated (boxes 520, 522, 524 and 526).

1.3.2 Exemplary Read Process

Figure 6:
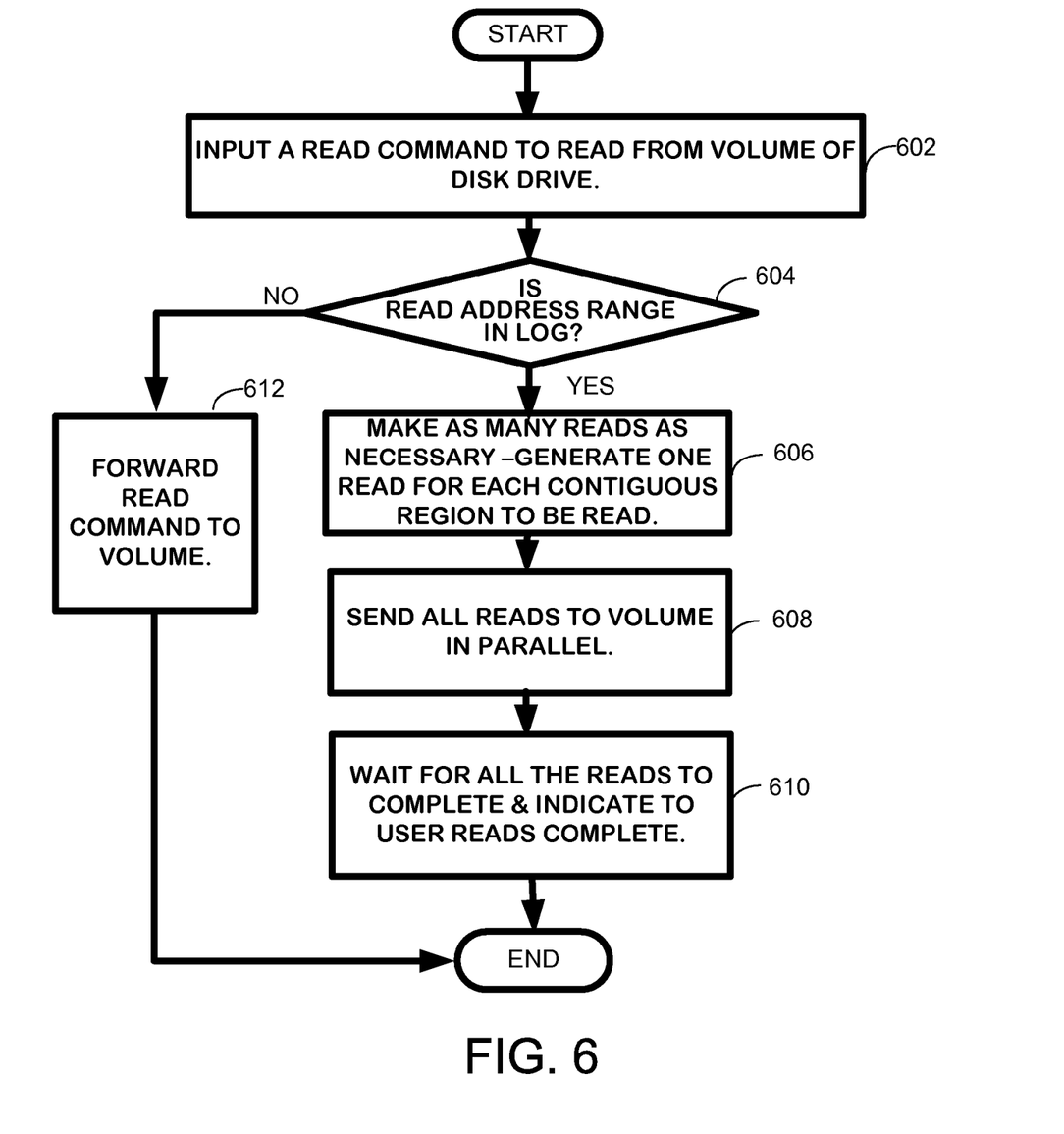
FIG. 6 is a flow diagram depicting another exemplary embodiment of a process employing one embodiment of the write optimizer to execute a read.

An exemplary process employing the write optimizer to perform a read from a disk is shown in FIG. 6. A read command to read from the volume of disk drive is input (box 602). A check is made to determine if the read address in the read command is in the write optimizer log(box 604). If the read address is in the write optimizer log, as many reads as necessary are made to read each contiguous region from the write optimizer log file are made (box 606). All of these reads are then sent to the volume, preferably in parallel (box 608). All reads are completed and an indication is then presented to the user that the reads are complete (box 610). If the read destination range is not in the write optimizer log then the read command is forwarded to the volume for completion (boxes 604 and 612).

1.3.3 Exemplary Copy Process

Figure 7:
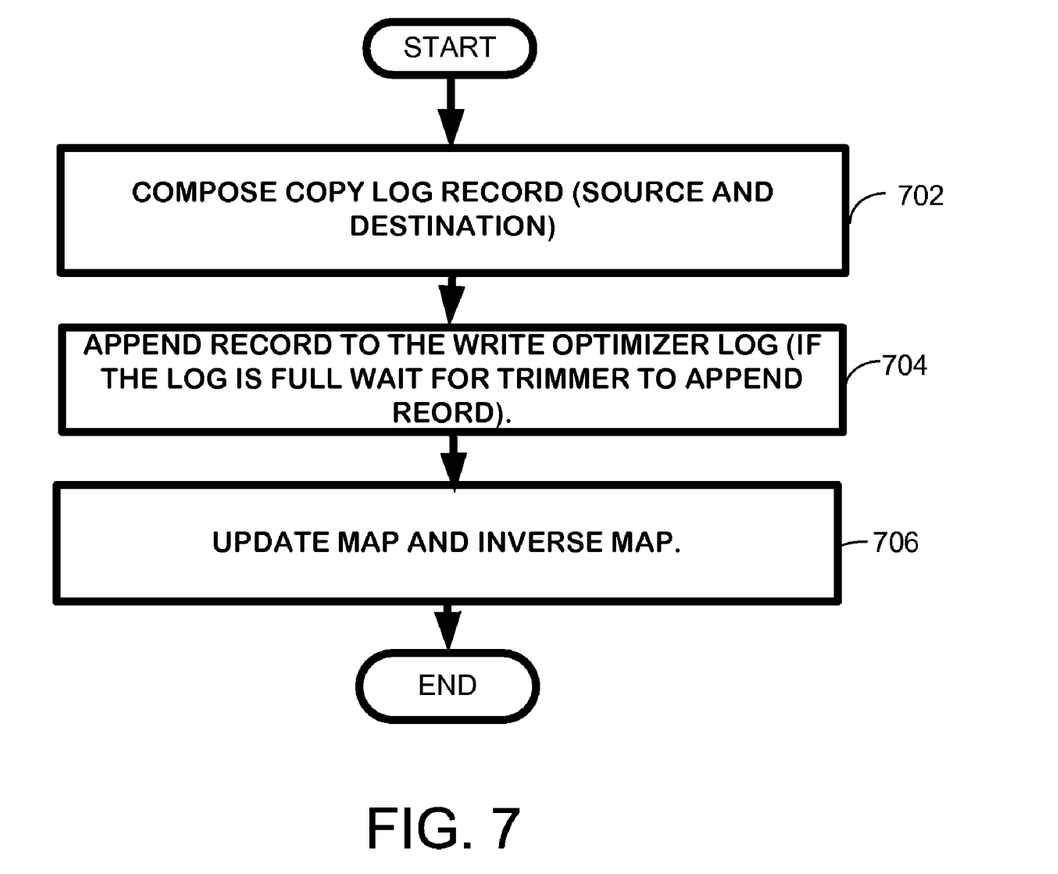
FIG. 7 is a flow diagram depicting another exemplary embodiment of a process employing one embodiment of the write optimizer to execute a copy.

An exemplary process employing the write optimizer to perform a copy to a volume is shown in FIG. 7. In this embodiment a copy write optimizer log record is created that includes the copy source address and destination address (box 702). The created copy record is appended to the write optimizer log, waiting for records in the write optimizer to be trimmed if the write optimizer log is full (box 704). The map and inverse map are then updated (box 706).

1.3.4 Exemplary Process for Installing Multiple Write Optimizer Records to a Volume.

Figure 8:
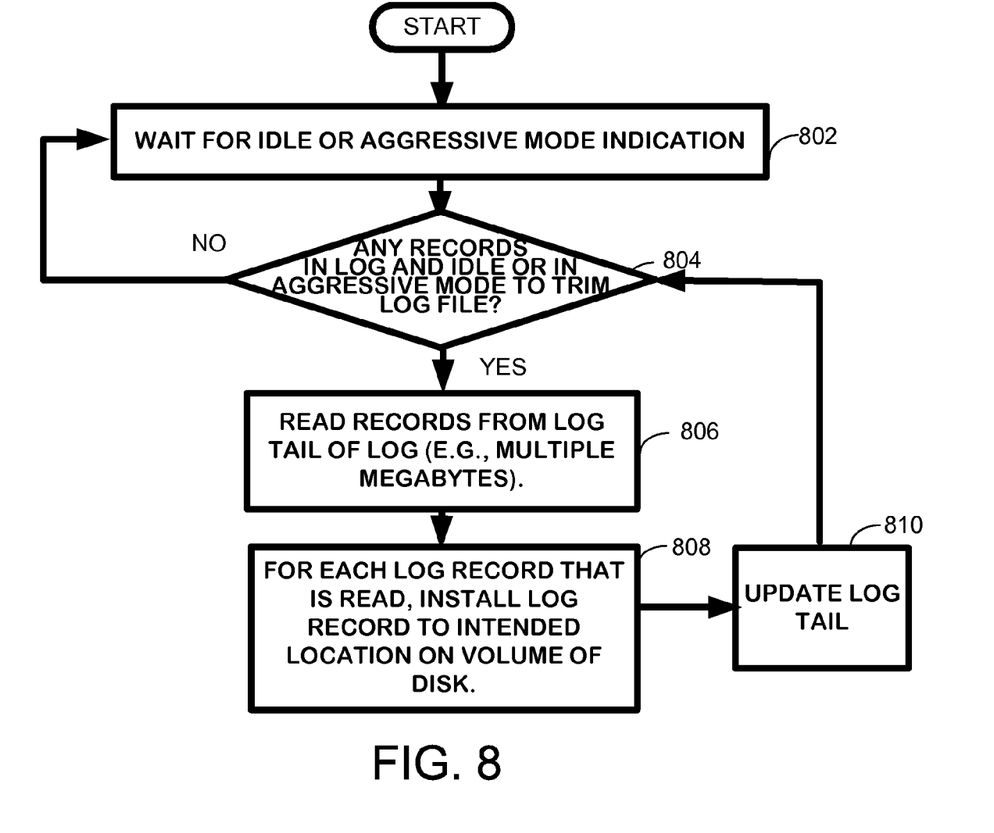
FIG. 8 is a flow diagram depicting another exemplary embodiment of a process employing one embodiment of the write optimizer to move blocks of data from a write optimizer log file to a volume of a disk drive when the disk is idle or the write optimizer log file is full.

An exemplary process employing the write optimizer to install data when the write optimizer log is full or the disk drive is idle is shown in FIG. 8. In this embodiment the write optimizer waits for an idle time when there are log records in the log optimizer log or for aggressive mode indication (box 802). Aggressive mode, in one embodiment, occurs when a user wants to write to the write optimizer log, but it is full. If there is nothing in the write optimizer log and the disk drive is idle and no aggressive mode indication is received, the write optimizer continues to wait (boxes 804, 802). If there are one or more entries in the write optimizer log and the write optimizer is idle or an aggressive mode indication is received, the write optimizer reads a large portion of the write optimizer log tail (e.g., multiple megabytes) (box 806) and for each log record that is read, the log record is installed on the volume (boxes 806 and 808). The pointer to the log tail is then updated on disk (box 810).

1.3.5 Another Exemplary Process for Installing a Log Record

Figure 9:
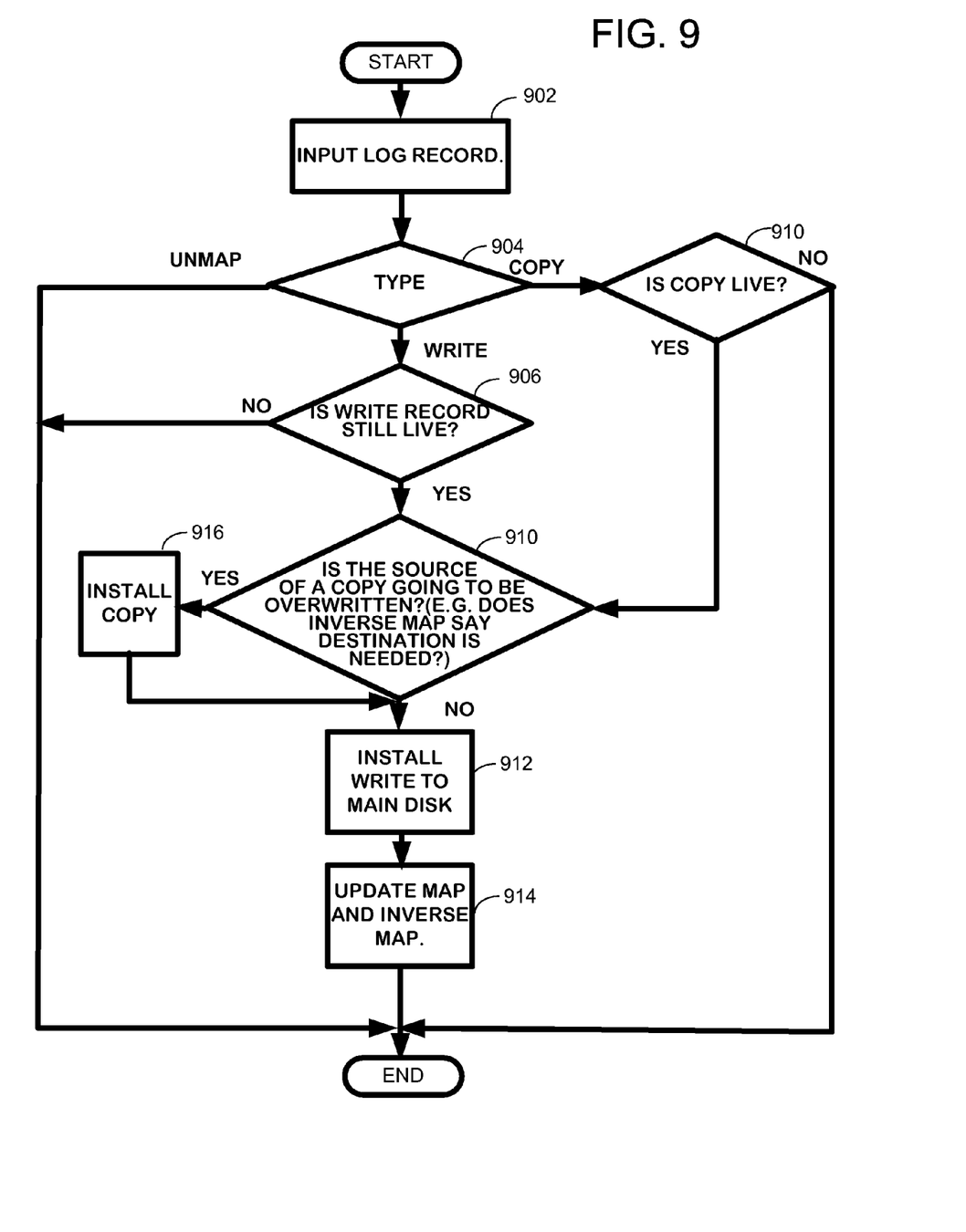
FIG. 9 is a flow diagram depicting an exemplary embodiment of a process employing one embodiment of the write optimizer to install a single log record on the volume of a disk drive.

Another, exemplary process employing the write optimizer to install a single log record from the write optimizer log is shown in FIG. 9. A write optimizer log record is input (box 902). A determination is made as to what type the input log record is—if it is an unmap, a write or a copy (box 904). If it is a write, a check is made as to whether the data in the write optimizer log record for this write log entry is still live, or has been overwritten. This is done by looking at the destination address in the log record, and then consulting the forward map for that address.(box 906). If the write log entry is not live, no action is taken (box 908). If the write log entry is live, another check is made to see if the source of a copy is going to be overwritten (e.g., does inverse map say destination is needed) (box 910). If not, the write is installed to the volume (box 912), and the map and inverse map are updated (box 914). If the source of a copy is going to be overwritten, the copy is installed on the disk (box 916), and then the write is installed to the volume (box 912) and the map and inverse maps are updated (box 914). If the type is a copy that has not been executed (box 918), another check is made to see if the source of a copy is going to be overwritten (box 910). If not, the write is installed to the volume (box 912), and the map and inverse map are updated (box 914). If the source of a copy is going to be overwritten, the copy is installed on the disk (916), and then the write is installed to the volume (box 912) and the map and inverse maps are updated (box 914). Finally, if the command is an unmap record command, no action is taken. The unmap is only used on boot.

1.3.6 Recovery

The essence of disks is persistent storage: When a write completes, the written data must be there when read occurs, even if the system crashes in the interim. Because the write optimizer relies on its in-memory data structure to determine where on disk to direct reads and because this in-memory data structure (e.g., 218 of FIG. 2) can be lost in a system crash, in one embodiment of the write optimizer recovery operations are run at volume mount time. In one embodiment, recovery begins by looking to find volume format parameters, which include the disk addresses of the log header records and a per-volume identifier (for example, such as the identifier 304 shown in FIG. 3). The write optimizer then reads the log header records to find the one that has the highest log header serial number. This log header record contains the lowest valid LSN in the log, and the address on the disk of this log record. From there, in one embodiment, the write optimizer reads the log starting at the tail and processes the log records that it finds. The write optimizer does not write zeros ahead of the log in order to save work (as do some other systems). As a result, the space beyond the log contains whatever data was on the disk, usually part of an old log record. An important part of recovery is determining where the log ends and stale data begins. In one embodiment, the write optimizer uses two techniques to achieve this. The first is that each log record contains a log serial number (LSN), and LSNs increase sequentially. If the space beyond the head of the log contains an old log record header, it will have too-small of an LSN. It is possible that file write data will be follow the log. This could lead to attacks in which the attacker writes file data that looks like a valid log record for overwriting some protected part of the disk (such as the password file) in hope that the system crashes and misidentifies this data as a legitimate write record. The write optimizer prevents this, in one embodiment, by using the identifier for each volume (e.g., 304 of FIG. 3) (preferably a cryptographically secure random number) in each log record header. Because non-privileged applications can never find this identifier, they cannot forge log records. One consequence of this technique is that allowing read access to the log can enable an attack that results in arbitrary writes. The handling of log records is straight forward. Write and copy records update the forward and inverse mappings just as they would if a write or copy operation was being executed. An unmap record specifies a region that should be removed from the mappings. Recall that unmap records are generated in response to an in-place write for which there might be a mapping in the log. The unmap records prevent stale write or copy records from resulting in corrupt mappings after a recovery.

One problem with recovery is that if the log is large and nearly full, it may take a long time to process. For instance, reading a 2 GB log sequentially at 70 MB/s takes nearly half a minute. In one embodiment, the write optimizer uses checkpoint log records in a way similar as those used in database applications. In normal operation when the write optimizer log is large and it has been a given period of time since the last checkpoint write, the write optimizer writes a copy of the forward mapping tree into the log, and points the log header records at the checkpoint record. On recovery, the write optimizer finds the newest checkpoint record from the log header record and uses it to build the forward and inverse mappings. It then proceeds to process the portion of the log from the checkpoint record to the head of the log in the ordinary way.

It should be noted that the write optimizer described herein has application to more than just disk drives. For example, the write optimizer can be employed with devices that are similar to disk drives such as flash memory. Flash memory is like a disk in that it is much, much faster to write sequentially than randomly, but unlike a disk there is no penalty for random reads. So, while the write optimizer can provide much improved performance for disk drives, it can also improve the performance of devices such as flash memory and similar devices.

2.0 The Computing Environment

The write optimizer is designed to operate in a computing environment. The following description is intended to provide a brief, general description of a suitable computing environment in which the write optimizer can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 10:
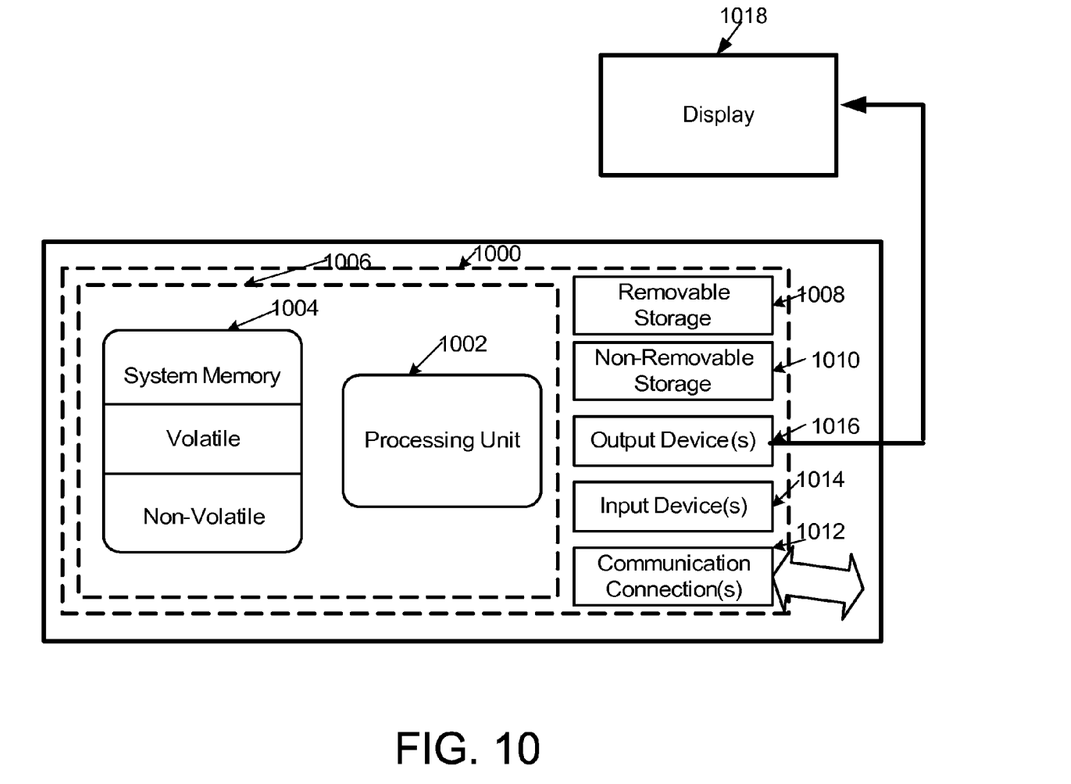
FIG. 10 is a schematic of an exemplary computing device in which the write optimizer can be employed.

FIG. 10 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 10, an exemplary system for implementing the write optimizer includes a computing device, such as computing device 1000. In its most basic configuration, computing device 1000 typically includes at least one processing unit 1002 and memory 1004. Depending on the exact configuration and type of computing device, memory 1004 may be volatile (such as RAM), non-volatile (such as ROM, flash memory, etc.) or some combination of the two. This most basic configuration is illustrated in FIG. 10 by dashed line 1006. Additionally, device 1000 may also have additional features/functionality. For example, device 1000 may also include additional storage (removable and/or non-removable) including, but not limited to, magnetic or optical disks or tape. Such additional storage is illustrated in FIG. 10 by removable storage 1008 and non-removable storage 1010. Computer storage media includes volatile and nonvolatile, removable and non-removable media implemented in any method or technology for storage of information such as computer readable instructions, data structures, program modules or other data. Memory 1004, removable storage 1008 and non-removable storage 1010 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 1000. Any such computer storage media may be part of device 1000.

Device 1000 can have a display 1018, and may also contain communications connection(s) 1012 that allow the device to communicate with other devices. Communications connection(s) 1012 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 1000 may have various input device(s) 1014 such as a keyboard, mouse, pen, camera, touch input device, and so on. Output device(s) 1016 such as speakers, a printer, and so on may also be included. All of these devices are well known in the art and need not be discussed at length here.

The write optimizer may be described in the general context of computer-executable instructions, such as program modules, being executed by a computing device. Generally, program modules include routines, programs, objects, components, data structures, and so on, that perform particular tasks or implement particular abstract data types. The write optimizer may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for writing data to a volume of one or more disk drives, comprising:
    inputting one or more data sets to be written to a volume of a disk drive;
    if a given data set of the one or more data sets is small, wherein small is defined as being less than a prescribed MB value,
        writing the given data set directly to a reserved area on the volume of the disk drive sequentially in write optimized order,
        writing the given data set in the reserved area, if the data set has not been overwritten, to an intended location on the volume of the disk in read optimized order when the reserved area is full; and
    if a given data set of the one or more data sets is large, wherein large is greater than the prescribed MB value, writing the given data set directly to the volume of the disk drive.

2. The computer-implemented process of claim 1, further comprising:
    writing at least some of the one or more data sets in the reserved area to intended locations on the volume of the disk drive if the disk drive is idle.

3. The computer-implemented process of claim 1 wherein the reserved area further comprises a set of records that each define a data set in the reserved area.

4. The computer-implemented process of claim 3 wherein each record in a data set of the reserved area further comprises:
    a constant identifying the record as a record in the reserved area;

a serial number of the record;
a record type;
a record length; and
a checksum of the record.

5. The computer-implemented process of claim 4 further comprising using the constant identifying the records as a record in the reserved area as a security measure in order to prevent unauthorized access to a record associated with the constant.

6. The computer-implemented process of claim 1 further comprising writing each data set that is written to the reserved area is written to the tail end of the reserved area.

7. The computer-implemented process of claim 1 wherein a small data set is smaller than 0.5 MB.

8. A computer-implemented process for writing data to a disk drive, comprising,
inputting a string to be written to the volume of a disk drive;
checking if the string is large, wherein large is larger than a prescribed MB value;
if the string is large, writing the string directly to the volume;
if the string is not large,
writing the string directly to a write log record in a write log file in a reserved area of the volume; and
writing the write log record, if not subsequently overwritten, in read optimized order from the write log to an intended location on the volume of the disk when the disk drive is idle or the write log is full.

9. The computer-implemented process of claim 8 further comprising:
writing strings that are not large to the reserved area of the volume in write-optimized order.

10. The computer-implemented process of claim 9 further comprising rewriting strings that are not large in read-optimized order to the volume of the disk drive.

11. The computer-implemented process of claim 10 further comprising checking to see if a string to be written that is large is a source of a copy and if the string is the source of the copy, installing the copy to the volume of the disk prior to installing the string to the volume of the disk.

12. The computer-implemented process of claim 8 further comprising reading a string from the volume of the disk.

13. The computer-implemented process of claim 12 further comprising:
inputting a read command;
determining if a read address associated with the read command is in the write log file;
if the read address is not in the write log file, forwarding the read command to the volume of the disk;
if the read address is in the write log file,
generating one read for each contiguous region of the disk to be read;
sending all reads to the volume in parallel;
waiting for all reads to complete; and
indicating to a user that the read is complete.

14. The computer-implemented process of claim 8 further comprising:
waiting for an idle or aggressive mode indication;
determining if there are write log records in the write log file, and the disk is idle or if an aggressive mode indication exists;
if there are write log records in the write log file, and the disk is idle or an aggressive mode indication exists, reading log records from the tail of the write log;
for each log record that is read, installing the log record from the write log to an intended location on the volume of the disk if the data in the log record has not been overwritten; and
updating the address of the tail of the write log file.

15. The computer-implemented process of claim 8 wherein each volume is a contiguous range of sectors of a drive that respond to read and write commands.

16. A system for optimizing data read and written to a data storage drive, comprising:
a general purpose computing device;
a computer program comprising program modules executable by the general purpose computing device, wherein the computing device is directed by the program modules of the computer program to,
employ a write optimizer filter in a computer operating system of a computing device to directly sequentially write, in write optimized order, small data sets of data to be written to a data storage drive to a reserved area on a volume of the data storage drive instead of an intended area of the data storage drive, wherein small is defined as being less than a prescribed MB value;
write large data sets directly to the intended location on the volume of on the data storage drive, wherein large is defined as being greater than a prescribed MB value; and
if the small data sets are not overwritten, move the small data sets of data written in write optimized order to the reserved area on the volume of the data storage drive to the intended location on the data storage drive in read optimized order when the data storage drive is idle.

17. The system of claim 16, further comprising a module to move the small data sets of data written to the reserved area on the volume of the data storage drive to the intended location on the data storage drive when the reserved area is full.

18. The system of claim 16 wherein that data storage drive is a disk drive.

19. The system of claim 16 further comprising a module in memory of the computing device comprising:
an address of the head of the reserved area;
an address of the tail of the reserved area;
a sequential number for each data set within the reserved area; and
a mapping tree that maps addresses of data sets in the reserved area to locations on the volume of the disk drive.

20. The system of claim 16 wherein the data storage drive is a flash memory device.

* * * * *